(12) United States Patent
Raetzsch et al.

(10) Patent No.: US 6,225,366 B1
(45) Date of Patent: May 1, 2001

(54) POLYOLEFIN FOAM MATERIALS OF HIGH DIMENSIONAL STABILITY AT ELEVATED TEMPERATURES

(75) Inventors: Manfred Raetzsch, Kirchnchchlag; Hartmut Bucka, Eggendorf; Achim Hesse, Linz; Ulf Panzer, Perg; Norbert Reichelt, Neuhofen, all of (AT)

(73) Assignee: Borealis AG, Schwechat-Mannswoerth (AT)

( * ) Notice: Subject to any disclaimer, the term of this patent is extended or adjusted under 35 U.S.C. 154(b) by 0 days.

(21) Appl. No.: 09/074,325

(22) Filed: May 7, 1998

(30) Foreign Application Priority Data

May 20, 1997 (DE) .............................................. 197 20 975

(51) Int. Cl.[7] ...................................................... C08J 9/00
(52) U.S. Cl. .............................. 521/134; 521/59; 521/60; 521/79; 521/81; 521/142; 521/143; 521/150
(58) Field of Search ................................ 521/59, 60, 142, 521/143, 79, 81, 150, 134

(56) References Cited

U.S. PATENT DOCUMENTS

| | | | | |
|---|---|---|---|---|
| 3,294,869 | * | 12/1966 | Robinson | 522/161 |
| 3,413,244 | * | 11/1968 | Landler et al. | 521/140 |
| 3,542,702 | * | 11/1970 | Okada et al. | 521/93 |
| 3,717,559 | * | 2/1973 | Oyama et al. | 521/143 |

* cited by examiner

*Primary Examiner*—Morton Foelak
(74) *Attorney, Agent, or Firm*—Jordan and Hamburg LLP

(57) ABSTRACT

Polyolefin foam materials of high dimensional stability at elevated temperatures are produced from modified polypropylenes and unmodified polypropylenes. The modified polypropylenes used are produced by mixing polypropylene particles with thermally decomposing free radical-forming agents, absorbing readily volatile bifunctional monomers and heating and melting the mixture. Areas of application for the polyolefin foam materials of high dimensional stability at elevated temperatures are the packaging sector, motor vehicle parts, sports and leisure equipment, industrial applications, as well as applications in the building sector.

15 Claims, No Drawings

POLYOLEFIN FOAM MATERIALS OF HIGH DIMENSIONAL STABILITY AT ELEVATED TEMPERATURES

BACKGROUND OF THE INVENTION

The invention relates to polyolefin foam materials of high dimensional stability at elevated temperatures which are made from modified and unmodified polypropylenes.

The preparation of polyolefin foam materials from unmodified polypropylenes is known.

Aside from polypropylene homopolymers, propylene-ethylene copolymers (U.S. Pat. No. 5,527,573) are also used for the production of extrusion foams. The high proportion of open-celled structures and the required use of special release devices is a disadvantage in the use of standard polypropylene for the production of extrusion foams. The melt viscosity determines cell growth during the production of extrusion foams and therefore is a parameter of cell collapse. In the case of standard polypropylene, the viscosity decreases as the elongation load increases. As a result, cell growth is unstable and the cell size is not uniform. When standard polypropylene, carbon dioxide as a blowing agent and nucleating agents are used, the foam sheet must be taken off by special release rolls heated to 95° C. (Dey, S., SPE-ANTEC 1996, 1955–1958).

The processing of unmodified polypropylenes and of unmodified polypropylene copolymers into particle foams by the suspension impregnation method requires expensive decentralized autoclaving equipment as operating sites. The foam is produced by impregnating polypropylene particles having diameters of 0.5 to 5 mm in an aqueous suspension with 0.1 to 0.4 kg of blowing agent per kg of polymer at a temperature of 5° to 20° C. below the crystallite melting point of the polymer and subsequent expansion by foaming (European Patent 0 453 836, German patent 40 12 239).

To achieve a uniform cell structure for the suspension-impregnation method using unmodified polypropylenes, expensive technological measures are required, such as flushing the reactor content with gas at the reactor bottom during the discharging process (below the stirrer or through the stirrer) (European patent 0 630 935) or adding a heating fluid during the emptying of the autoclave, until ¾ of the particle foam has been discharged (European patent 0 280 943). High shrinkage is a further problem of particle foams, which have been produced from unmodified polypropylenes using butane as a blowing agent. The shrinkage can be reversed by an expensive treatment of the shrunken particles at a temperature less than 20° C. below the softening temperature under the action of compressed air or a compressed inert gas (EP 0 687 709).

It is furthermore known that, by using polypropylene blends and modified polypropylenes, polypropylenes can be processed on normal polyethylene standard foam extruders into extrusion foams and extrusion particle foams.

Known blend components for polypropylene for the production of extrusion foams on normal polyethylene standard foam extruders are propylene-ethylene copolymers (European patent 0 291 764), polyethylene (British patent 2,099,434), EVA (British patent 2,099,434), butyl rubber (European patent 0 570 221), styrene butadiene rubber (U.S. Pat. No. 4,467,052) and methacrylate copolymers (U.S. Pat. No. 5,508,307). These blending components, however, lead to a large decrease in the dimensional stability at elevated temperatures, the stiffness and the compression strength of the polypropylene extrusion foams.

Known modified polypropylenes, which are suitable for the production of extrusion foams and extrusion particle foams, are silane-grafted polypropylene (European patent 0 646 622) and polypropylene modified by polymerizable peroxides (WO 94 05 707) and polypropylene modified by high-energy electron radiation (European patent 0 190 889, De Nicola, A., Polymeric Materials Science and Engineering (1995), 106–108). The use of these modified polypropylenes in mixtures with unmodified polypropylenes is also possible.

The very high costs of the safety measures for the biological shielding of the high-energy radiation are a disadvantage of the method of modifying polypropylene by high-energy electron radiation. These safety measures make it necessary to shield the irradiation chamber hermetically by means of special concrete walls or lead segment constructions, to employ an expensive measuring technique as radiation protection and to monitor the operating personnel medically.

It is an object of the present invention to develop polyolefin foam materials of high dimensional stability at elevated temperatures from modified polypropylenes and unmodified polypropylenes, which avoid the known disadvantages of known products. It is a further object of the invention that the modified polypropylenes, used for the production of the polyolefin foam material, be readily accessible by a technologically simple method.

SUMMARY OF THE INVENTION

The inventive objective is accomplished by polyolefin foam materials of high dimensional stability at elevated temperatures, with foam densities of 5 to 700 kg/m$^3$ and preferably of 10 to 500 kg/m$^3$, from 1 to 100% by weight and preferably 5 to 100% by weight of modified polypropylenes and 0 to 99% by weight and preferably 0 to 95% by weight of unmodified polypropylenes, The modified polypropylenes, used for the production of polyolefin foam materials, being prepared by a) mixing the polypropylene particles in a continuous mixer with 0.05 to 3% by weight, based on the polypropylenes used, of acyl peroxides, alkyl peroxides, hydroperoxides and/or peresters as thermally decomposing free radical-forming agents, which optionally are diluted with inert solvents, heating to 30° to 100° C. and preferably to 70° to 90° C., followed by b) the absorption of readily volatile, bifunctional monomers, particularly of $C_4$ to $C_{10}$ dienes and/or $C_7$ to $C_{10}$ divinyl compounds, by the polypropylene particles from the gas phase at a temperature T(° C.) of 20° to 120° C. in a continuous gas-solid absorber before the mixture is melted; the average absorption time $\tau_s$ [s] being 10 seconds to 1000 seconds and preferably 60 seconds 600 seconds and the proportion of bifunctional unsaturated monomers being 0.01 to 10% by weight and preferably 0.05 to 2% by weight based on the polypropylenes used, followed by c) heating and melting the polypropylene particles, in which the acyl peroxides, alkyl peroxides, hydroperoxides and/or peresters act; as thermally decomposing free radical-forming agents, and the bifunctional unsaturated monomers which; are absorbed under an atmosphere of inert gas and change these toand these readily volatile, bifunctional monomers at 110° to 210° C., the thermally decomposing free radical-forming agents being decomposed, followed by d) heating the melt at 220° to 300° C. while removing; unreacted monomers and decomposition products and e) granulating the melt in a known manner.

DETAILED DESCRIPTION OF THE INVENTION

Pursuant to the invention, 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers and/or reinforcing agents, 2 to 20% by weight of flame retardants and/or 0.01 to 5% by weight of processing aids, based on the polypropylenes used, can be added before steps a) and/or e) of the process and/or before or during steps c) and/or d) of the process as further additives.

The acyl peroxides, used as thermally decomposing free radical-forming agents, for the production of the modified polypropylenes, preferably are benzoyl peroxide, 4-chlorobenzoyl peroxide, 3-methoxybenzoyl peroxide and/or methyl benzoyl peroxide.

As alkyl peroxides, for the production of the modified polypropylenes, particularly allyl t-butyl peroxide, 2,2-bis (t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide are suitable.

Preferred peresters and peroxy carbonates, which are used as thermally decomposing free radical-forming agents for the production of modified polypropylenes, are butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butyl-bicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Advantageously, mixtures of these thermally decomposing free radical-forming agents are suitable for the production of modified polypropylenes, which are used for the inventive polyolefin foam materials of high dimensional stability at elevated temperatures.

As bifunctional unsaturated monomers for the production of modified polypropylenes, which are used for the polyolefin foam materials of high dimensional stability at elevated temperatures, especially all bifunctional, unsaturated monomeric compounds, which can be absorbed from the gas phase and polymerized with the help of free radicals, can be used. Preferably, the following, bifunctional, unsaturated monomers are used in amounts of 0.01 to 10% by weight and preferably of 0.05 to 2% by weight, based on the polypropylenes used:

divinyl compounds, such as divinylaniline, m-divinylbenzene, p-divinylbenzene, divinylpentane and/or divinylpropane;

allyl compounds, such as allyl acrylate, allyl methacrylate, allyl methyl maleate and/or allyl vinyl ether;

dienes, such as butadiene, chloroprene, cyclohexadiene, cyclopentadiene, 2,3-dimethylbutadiene, heptadiene, hexadiene, isoprene and/or 1,4-pentadiene.

Likewise, mixtures of these unsaturated monomers are suitable for the production of modified polypropylenes, which are used for the inventive polyolefin foam materials of high dimensional stability at elevated temperatures.

The stabilizers, suitable as further additives for the production of modified polypropylenes preferably are mixtures of 0.01% to 0.6% by weight of phenolic antioxidants, 0.01% to 0.6% by weight of 3-arylbenzofuranones, 0.01% to 0.6% by weight of processing stabilizers based on phosphites, 0.01% to 0.6% by weight of high temperature stabilizers based on disulfides and thioethers and/or 0.01% to 0.8% by weight of sterically hindered amines (HALS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenyl) propionate, 1,3,5-trimethyl-2,4,6-tris(3'-5'-di-t-butyl-4-hydroxybenzyl)benzene and/or pentaerythritoltetrakis(3-(3,5-di-t-butyl-4-hydroxyphenyl)) propionate.

As benzofuranone derivative, particularly 5,7-di-t-butyl-3-(3,4-dimethylphenyl)-3H-benzofuran-2-one is suitable.

As HALS compounds, bis-2,2,6,6-tetramethyl-4-piperidyl sebacate and/or poly-((1,1,3,3,-tetramethylbutyl)-imino)-1,3,5-triazine-2,4,diyl)(2,2,6,6-tetra-methyl-piperidyl)-amino)-hexamethylene-4-(2,2,6,6-tetramethyl) piperidyl)-imino) are particularly suitable.

As processing aids, calcium stearate, magnesium stearate and/or waxes can be used.

The polypropylene particles, used for the production of the modified polypropylenes, may consist of propylene homopolymers as well as of copolymers of propylene and α-olefins with 2 to 18 carbon atoms, as well as of mixtures of said polypropylenes.

Preferred are polypropylene particles from polypropylenes with a bimodal distribution of molecular weights, which were synthesized in a reactor cascade using Ziegler-Natta catalysts or metallocene catalysts, with weight average molecular weights $M_w$ of 500,000 to 1,500,000 g/mole, number average molecular weights $M_n$ of 25,000 to 100,000 and $M_w/M_n$ values of 5 to 60 and preferably weight average molecular weights $M_w$ of 600,000 to 1,000,000 g/mole, number average molecular weights $M_n$ of 30,000 to 100,000 and atoms values of 15 to 35.

Especially preferred in this connection are polypropylene homopolymers, random propylene copolymers, propylene block copolymers, random propylene block copolymers and elastomeric polypropylenes.

As unmodified polypropylenes, which are used for the production of the inventive polyolefin foams of high dimensional stability at elevated temperatures, the same polypropylenes are used, which form the starting materials for the production of the modified polypropylenes.

For the production of the modified polypropylenes, the polypropylenes are used as particles in the solid phase and exist preferably as a powder, granulate or grit. It proves to be particularly advantageous to directly modify the polyolefin particles coming from the polymerization plant.

Modified polypropylenes, which contain chemically bound butadiene, isoprene, dimethylbutadiene and/or divinylbenzene as bifunctional, unsaturated monomers, are a special variation of the modified polypropylene used as a component for the manufacture of the polyolefin foam materials.

Extrusion foams with foam densities of 10 to 600 kg/m³, particularly in the form of particle foams and of foamed semi-finished products, such as sheets, panels, pipes or profiles, are preferred.

The inventive polyolefin foams with foam densities of 5 to 700 kg/m³ and preferably of 10 to 500 kg/m³, from 1 to 100% by weight and preferably 5 to 100% by weight of modified polypropylenes and 0 to 99% by weight and preferably of 0 to 95% by weight of unmodified polypropylenes, can likewise be particle foams produced by the suspension impregnating method.

The polyolefin foam materials of high dimensional stability at elevated temperatures, with foam densities ranging from 5 to 700 kg/m³ and preferably from 10 to 500 kg/m³, are produced pursuant to the invention from 1 to 100% by weight and preferably 5 to 100% by weight of modified polypropylene and 0 to 99% by weight and preferably 0 to 95% by weight of unmodified polypropylene using gas-emitting blowing agents or hydrocarbons, chlorinated hydrocarbons and/or gases as blowing agents, the modified polypropylenes, used for producing polyolefin extrusion foam materials, being obtained by a) mixing polypropylene particles in a continuous mixer with 0.05 to 3% by weight, based on the polypropylenes used, of acyl peroxides, alkyl peroxides, hydroperoxides and/or peresters as thermally decomposing free radical-forming agents, which are optionally diluted with inert solvents, heating to 30° to 100° C. and preferably to 70° to 90° C., followed by b) the absorption of readily volatile, bifunctional monomers, particularly $C_4$ to $C_{10}$ dienes and/or $C_7$ to $C_{10}$ divinyl compounds by the polypropylene particles from the gas phase at a temperature $T(° C.)$ of 20° to 120° C. in a continuous gas-solid absorber before the mixture is melted, the average absorption time $\tau_s$ [s] being 10 to 1,000 seconds and preferably 60 to 600 seconds and the proportion of bifunctional, unsaturated monomers being 0.01% to 10% by weight and preferably 0.05% to 2% by weight, based on the polypropylene used, followed by c) heating and melting the polypropylene particles, in which the acyl peroxides, alkyl peroxides, hydroperoxides and/or peresters, as thermally decomposing free radical-forming agents, and the bifunctional unsaturated monomers which; are absorbed under an atmosphere of inert gas, and the readily volatile bifunctional monomers at 110° to 210° C., the thermally decomposing free radical-forming agents being decomposed, followed by d) heating the melt to 220° to 300° C. with removal of unreacted monomers and decomposition products and e) granulating the melt by a known procedure; and 0.01 to 2.5% by weight of stabilizers, 0.1 to 1% by weight of antistatic agents, 0.2 to 3% by weight of pigments, 0.05 to 1% by weight of nucleating agents, 5 to 40% of fillers and/or reinforcing materials, 2 to 20% by weight of flame retardants and/or further additives include, 0.01 to 5% by weight of processing aids, based on the polypropylenes used, and are added before steps a) and/or e) of the process and/or before or during step c) and/or d) of the process.

The packaging sector is a preferred field of application for the inventive polyolefin foam materials of high dimensional stability at elevated temperatures. Especially preferred are food packagings, particularly packaging, which can be used in a microwave oven, such as tubs and plates; and as well as reusable and transporting packagings, palettes for transporting in-house, packaging corners and equipment hoods.

A further preferred area of use for the inventive polyolefin foam materials of high dimensional stability at elevated temperatures is the motor vehicle sector, where the polyolefin foams are used particularly for interior parts of motor vehicles, such as instrument panels, sunshades, arm rests, head rests, air ducts and door linings, as well as for external motor vehicle parts, such as the core material for bumper bars and the edge protection for hollow doors.

Preferred is also the use of the inventive polyolefin foam materials of high dimensional stability at elevated temperatures for sport and leisure equipment, such as surfboards, body boards, fitness mats, lawn substrates, safety helmets, shoe soles and joint protection.

Furthermore, industrial applications, particularly components of electric and electronic equipment, seals, vibration substrates, buoys and oil barriers and applications in the construction sector, particularly roofing sheets, floor insulations, house insulating panels and pipe insulation shells represent a preferred field of use.

The invention is further explained by the following examples.

EXAMPLE 1

To produce an extrusion foam, a mixture of 40% by weight of an unmodified polypropylene homopolymer, with a melt index of 0.2 g/10 min. at 230° C./2.16 kg, and 60% by weight of a modified, random polypropylene copolymer, containing 0.32% by weight of bound divinylbenzene, as determined by IR spectroscopy, and having a melt index of 1.35 g/10 min. at 230° C./2.16 kg, are used.

The modified random polypropylene copolymer is produced by homogeneously mixing a powdery random polypropylene copolymer (with a melt index of 0.85 g/10 min. at 230° C./2.16 kg and an average particle diameter of 0.85 mm) with 0.05% by weight hydrotalcit, 0.05% by weight of calcium stearate and 0.45% by weight of t-butyl peroxybenzoate (in each case based on the polypropylene copolymer) in a flow-through mixer at 70° C. and transferring the polypropylene copolymer, charged with the thermally decomposing free radical-forming agents and auxiliary materials, to a continuous screw mixer. During a residence time of 4 minutes at 70° C., the polypropylene copolymer is charged absorptively by the circulating gas, containing divinylbenzene, with 0.35% by weight of divinylbenzene, based on the polypropylene copolymer. After transfer to the twin screw extruder, the charged polypropylene powder, with addition of 0.1% by weight of Irganox 1010 and 0.1% by weight of Irgaphos 168, is melted at a mass temperature of 225° C. and, after a coarse degassing with the addition of water as entraining agent, subjected to a final degassing, discharged and granulated.

The mixture of 40% by weight of unmodified polypropylene homopolymer, with a melt index of 0.2 g/10 min. at 230° C./2.16 kg, and 60% by weight of modified random propylene copolymer is processed into an extrusion foam in tandem extrusion equipment, the two polypropylene components and 0.15% by weight of a mixture of sodium bicarbonate and citric acid, based on the polypropylene mixture, being transferred to a homogenizing extruder having a temperature profile of 175°/185°/190°/215° C. A methylbutane mixture (6.2% by weight, based on the polypropylene mixture) is added to the melt. When the mixture is homogenized, the melt is transferred into the foam extruder having a temperature profile of 175°/170°/170°/165°/165° C., discharged through a tubular die and drawn off and, with internal air cooling, wound on reels as a foamed sheet tube.

The resulting foam sheet, with a density of 205 kg/m$^3$ and a modulus of bending of 14.5×10$^7$ N/m$^2$, is used for thermoforming food containers.

EXAMPLE 2

To produce a particle extrusion foam, a mixture of 45% by weight of a random polypropylene copolymer, with a melt index of 0.65 g/10 min. at 230° C./2.16 kg, and 55% by weight of a modified, polypropylene homopolymer, containing 1.0% by weight of bound butadiene, as determined by IR spectroscopy, and having a melt index of 0.85 g/10 min. at 230° C./2.16 kg, are used.

The modified polypropylene homopolymer is produced by homogeneously mixing a powdery polypropylene homopolymer (with a melt index of 0.2 g/10 min. at 230° C./2.16 kg and an average particle diameter of 0.55 mm) with 0.1% by weight of calcium stearate and 0.09% by weight of bis(t-butyl peroxy)-2,5-dimethylhexane (in each case based on the polypropylene homopolymer) in a continuous flow-through mixer at 45° C. Subsequently, the polypropylene homopolymer, charged with thermally decomposing free radical-forming agent and auxiliary material, is transferred to a continuous screw mixer and, at a residence time of 6 minutes at 45° C., charged absorptively by the butadiene-containing circulating gas with 1.1% by weight of butadiene, based on the polypropylene homopolymer. After transfer to the twin screw extruder, the charged polypropylene powder, with addition of 0.1% by weight of Irganox 1010 and 0.1% by weight of Irgaphos 168, is melted at a mass temperature of 235° C. and, after a coarse degassing with the addition of water as an entraining agent, subjected to a final degassing, discharged and granulated.

The mixture of 45% by weight of random polypropylene copolymer, with a melt index of 0.65 g/10 min. at 230° C./2.16 kg, and 55% by weight of modified propylene homopolymer (containing 1.0% by weight of bound butadiene and having a melt index of 0.85 g/10 min. at 230° C./2.16 kg) is processed into an extrusion particle foam in a foam extruder with addition of 1.3% by weight of a mixture of sodium bicarbonate and citric acid as a nucleating agent and 9.5% by weight of a methylbutane mixture as a blowing agent, which is injected at 195° C. into the synthetic resin melt. The foamed melt is discharged at a die temperature of 152° C. and the resulting foam extrudate cut into segments immediately. The foam particles are stored at room temperature for 20 hours in order to achieve pressure equilibration between the interior of the cells and the surroundings.

The particle foam is processed by the steam-chest molding method by blowing superheated steam through the mold, filled with the particle foam, into pipe insulation shells to be used for temperatures up to 120° C. with a density of 95 kg/m$^3$. Stamped out test specimens have a tensile strength of 710 kPa and a water absorption of 1.15% (23° C., 170 hours).

What is claimed is:

1. Non-cross-linked polyolefin foam materials of high dimensional stability at elevated temperatures comprising 1 to 100% by weight modified polypropylene and 0 to 99% by weight unmodified polypropylene, the modified polypropylene being produced by a process comprising:

mixing polypropylene particles with 0.05 to 3% by weight, based on the weight of the polypropylene particles, of acyl peroxides, alkyl peroxides, hydroperoxides and/or peresters at temperatures ranging from 30° to 100° C., the acyl peroxides, alkyl peroxides, hydroperoxides and/or peresters functioning as thermally decomposing free radical forming agents;

causing the polypropylene particles to absorb 0.01 to 10% by weight, based on the weight of the polypropylene particles, of bifunctional, saturated monomers;

heating and melting the polypropylene particles and the bifunctional, saturated monomers at 110° to 210° C. to form a melt, whereby the thermally decomposing free radical forming agents are decomposed;

heating the melt at 220° to 300° C.; and granulating the melt.

2. The polyolefin foam materials of claim 1, wherein the polypropylene particles are prepared from at least one modified propylene homopolymer selected from modified propylene homopolymers based on polypropylene homopolymers with a bimodal distribution of molecular weights, weight average molecular weight of 500,00 to 1,500,000 g/mole, number average molecular weights of 25,000 to 100,000 g/mole, and a ratio of weight average molecular weight to number average molecular weight of 5 to 60, modified copolymers of propylene, or modified copolymers of α-olefins having 2 to 18 carbon atoms.

3. The polyolefin foam materials of claim 2, wherein the modified copolymers of propylene are at least one selected from modified random propylene copolymers, modified propylene block copolymers, modified random propylene block copolymers or modified elastomeric polypropylenes.

4. The polyolefin foam materials of claim 1, wherein the polypropylene particles are prepared from propylene homopolymers, copolymers of propylene and/or α-olefins having 2 to 18 carbon atoms.

5. Sheets, panels, pipes, profiles or particle foams comprising the polyolefin foam materials of claim 1.

6. Motor vehicle instrument panels, sunshades, arm rests, head rests, air ducts, door linings, or core material for motor vehicle bumper bars or edge protection for hollow motor vehicle doors, comprising the polyolefin foam materials of claim 1.

7. Surfboards, body boards, fitness mats, lawn substrates, safety helmets, shoe soles or joint protectors, comprising the polyolefin foam materials of claim 1.

8. Seals, vibration substrates, buoys, oil barriers, roofing sheets, floor insulations, house insulating panels, packaging or pipe insulation shells, comprising the polyolefin foam materials of claim 1.

9. The polyolefin foam materials of claim 4, wherein the polypropylene particles are prepared from random propylene copolymers, propylene block copolymers, random propylene block copolymers and/or elastomeric polypropylenes.

10. The polyolefin foam materials of claim 1, wherein the polyolefin foam materials are 5 to 100% by weight modified polypropylene and 0 to 95% by weight unmodified polypropylene.

11. The polyolefin foam materials of claim 10, wherein the bifunctional, unsaturated monomer is butadiene, isoprene, dimethylbutadiene and/or divinylbenzenes.

12. The polyolefin foam materials of claim 1, wherein the temperature range during the first step of mixing is 70° to 90° C.

13. The polyolefin foam materials of claim 1, wherein the bifunctional, saturated monomers are $C_4$ to $C_{10}$ dienes and/or $C_7$ to $C_{10}$ divinyl compounds.

14. The polyolefin foam materials of claim 1, wherein the polypropylene particles absorb 0.05 to 2% by weight, based on the weight of the polypropylene particles, of bifunctional, saturated monomers.

15. A method of making modified polypropylene comprising:

mixing polypropylene particles with 0.05 to 3% by weight, based on the weight of the polypropylene particles, of acyl peroxides, alkyl peroxides, hydroperoxides and/or peresters at temperatures ranging from 30° to 100° C., the acyl peroxides, alkyl peroxides, hydroperoxides and/or peresters functioning as thermally decomposing free radical forming agents;

causing the polypropylene particles to absorb 0.01 to 10% by weight, based on the weight of the polypropylene particles, of bifunctional, saturated monomers;

heating and melting the polypropylene particles and the bifunctional, saturated monomers at 110° to 210° C. to form a melt, whereby the thermally decomposing free radical forming agents are decomposed;

heating the melt at 220° to 300° C.; and granulating the melt.

* * * * *